(12) United States Patent
Tooman et al.

(10) Patent No.: US 9,849,618 B1
(45) Date of Patent: Dec. 26, 2017

(54) VALVE GATE ASSEMBLY ACTUATOR

(71) Applicant: Plastic Engineering & Technical Services, Inc., Auburn Hills, MI (US)

(72) Inventors: Patrick A Tooman, Clarkston, MI (US); Bruce Casey, White Lake, MI (US)

(73) Assignee: PLASTIC ENGINEERING & TECHNICAL SERVICES, INC., Auburn Hills, MI (US)

(*) Notice: Subject to any disclaimer, the term of this patent is extended or adjusted under 35 U.S.C. 154(b) by 0 days.

(21) Appl. No.: 15/498,636

(22) Filed: Apr. 27, 2017

Related U.S. Application Data

(60) Provisional application No. 62/469,824, filed on Mar. 10, 2017.

(51) Int. Cl.
*B29C 45/28* (2006.01)
*F16K 31/04* (2006.01)
*B29C 45/23* (2006.01)

(52) U.S. Cl.
CPC .......... *B29C 45/281* (2013.01); *B29C 45/231* (2013.01); *F16K 31/047* (2013.01); *B29C 2045/2824* (2013.01)

(58) Field of Classification Search
CPC ............ B29C 45/281; B29C 2045/282; B29C 2045/2824
See application file for complete search history.

(56) References Cited

U.S. PATENT DOCUMENTS

| | | |
|---|---|---|
| 4,173,448 A | 11/1979 | Rees et al. |
| 4,810,184 A | 3/1989 | Gellert et al. |
| 4,964,795 A | 10/1990 | Tooman |
| 5,378,138 A | 1/1995 | Onuma et al. |
| 5,470,219 A | 11/1995 | Yokoyama et al. |
| 5,491,372 A | 2/1996 | Erhart |
| 5,531,581 A | 7/1996 | Donnell, Jr. |
| 5,557,154 A | 9/1996 | Erhart |
| 5,670,190 A | 9/1997 | Osuna-Diaz |
| 5,783,234 A | 7/1998 | Teng |
| 5,820,803 A | 10/1998 | Hashimoto |
| 5,834,041 A | 11/1998 | Sekine et al. |
| 5,840,231 A | 11/1998 | Teng |
| 5,919,492 A | 7/1999 | Tarr et al. |
| 6,294,122 B1 | 9/2001 | Moss et al. |
| 7,588,436 B2 | 9/2009 | Tooman et al. |

*Primary Examiner* — Jill L Heitbrink

(57) ABSTRACT

An improved actuator for a valve gate assembly is provided. The actuator includes a planetary assembly for converting rotation of an electrical motor into linear movement of a valve gate pin while also providing mechanical advantage to the motor against injection pressures from 15,000 psi to at least 25,000 psi. An internal cooling volume surrounds the motor for continuously cooling the motor with water, and an internal encoder converts an angular rotation within the actuator into an analog or digital signal for output to a controller.

20 Claims, 3 Drawing Sheets

VALVE GATE ASSEMBLY ACTUATOR

CROSS-REFERENCE TO RELATED APPLICATIONS

This application claims the benefit of U.S. Provisional Application 62/469,824, filed Mar. 10, 2017, the disclosure of which is incorporated by reference in its entirety.

FIELD OF THE INVENTION

The present invention relates to a valve gate assembly actuator for controlling the flow of molten material into a mold cavity under high pressures for a hot-runner system.

BACKGROUND OF THE INVENTION

Injection molding involves the transfer of a molten material into a mold, typically at high pressures. Plastic injection molding is one such process, in which an injection unit melts pelletized plastic into molten plastic before injecting the molten plastic into a closed mold. In its most basic configuration, the mold includes two halves, a core half and a cavity half, which cooperate to define a mold cavity in the desired shape of a single article. The molten plastic cools and solidifies between the mold halves, and is then ejected from the mold cavity as the finished article.

To carefully regulate the flow of molten plastic into the mold cavity, typically as a controlled-volume shot of molten plastic, the injection unit can include a series of valve gates. Each valve gate can be seated over an opening in the mold to selectively allow the flow of molten plastic into the mold cavity. Known valve gates include a valve gate pin disposed within a passageway that has a narrow terminal end adjacent to the mold opening. The valve gate pin moves away from and toward the terminal end of the passageway to open and close the valve gate, respectively, which allows the introduction of the molten material into the mold cavity. This process is repeated for each successive shot of molten plastic.

Movement of the valve gate pin is typically performed by actuators under control of a processor. In many injection molding operations, the actuators must overcome injection pressures that range from 2,000 psi to at least 25,000 psi, dependent upon a variety of factors, including the density of the molten plastic. Existing actuators include pneumatic actuators and hydraulic actuators. However, these actuators require a source of compressed air or hydraulic fluid, which may lose pressure over the course of an injection molding operation. While electromechanical actuators are also known, there remains a continued need for an improved electromechanical actuator with increased reliability, pressure resistance, and precision over existing systems.

SUMMARY OF THE INVENTION

An improved actuator for a valve gate assembly is provided. The actuator includes a planetary assembly for converting rotation of an electrical motor into linear movement of a valve gate pin while also providing mechanical advantage to the motor against injection pressures from 15,000 psi to at least 25,000 psi. An internal cooling volume surrounds the motor for continuously cooling the stator with water, and an internal encoder converts an angular position into an analog or digital signal for output to a controller.

In one embodiment, the planetary assembly is concentrically received within the interior of the rotor, having a plurality of planet gears that are intermeshed with a sun screw. The sun screw includes a mounting head for attachment to a valve gate pin. The mounting head is non-rotatably received within a guide channel in the actuator housing. Rotation of the rotor is converted by the planetary assembly into linear movement of the mounting head, and consequently the valve gate pin. The valve gate pin reciprocates but does not rotate, allowing for the tip of the valve gate pin to be asymmetrical, for example having a bevel tip.

In one embodiment, the encoder includes an encoder sensor and an encoder ring. The encoder sensor is fixed relative to the actuator housing. The encoder ring is coupled to a spindle that rotates in unison with the planetary assembly. The encoder sensor and the encoder ring are concentrically arranged with respect to each other, with the encoder sensor being positioned radially outward of the encoder ring. Rotation of the encoder ring is converted to an analog or digital signal by the encoder sensor for output to a controller. The controller tracks the rotation of the encoder ring, and by extension, the planetary assembly.

In one embodiment, the actuator housing includes a sidewall that is spaced apart from a stator housing. The region between the sidewall and the stator housing are bordered by upper and lower o-rings, this region defining a cooling volume that circumferentiates the stator. The sidewall includes an inlet opening and an outlet opening for a cooling fluid. The cooling fluid includes water at ambient temperatures (e.g., 68° F.) in the present embodiment but can include chilled water in other embodiments.

As discussed herein, the present invention provides an improved valve gate assembly actuator that eliminates the use of hydraulics and pneumatics. The actuator enables precision control of a valve gate pin in increments of as little as 0.001 inches while withstanding injection pressures of at least 25,000 psi. The actuator also includes continuous cooling to guard against overheating while also increasing its useful life for plastic injection molding operations.

These and other features and advantages of the present invention will become apparent from the following description of the invention, when viewed in accordance with the accompanying drawings and appended claims.

DETAILED DESCRIPTION OF THE CURRENT EMBODIMENT

The invention as contemplated and disclosed herein includes an actuator for a valve gate assembly. The actuator includes a planetary assembly for converting rotation of an electrical motor into linear movement of a valve gate pin while also providing mechanical advantage to the motor against high injection pressures. A description of the actuator is set forth in Part I below, and a description of its operation follows in Part II below.

I. Actuator Overview

Figure 1:
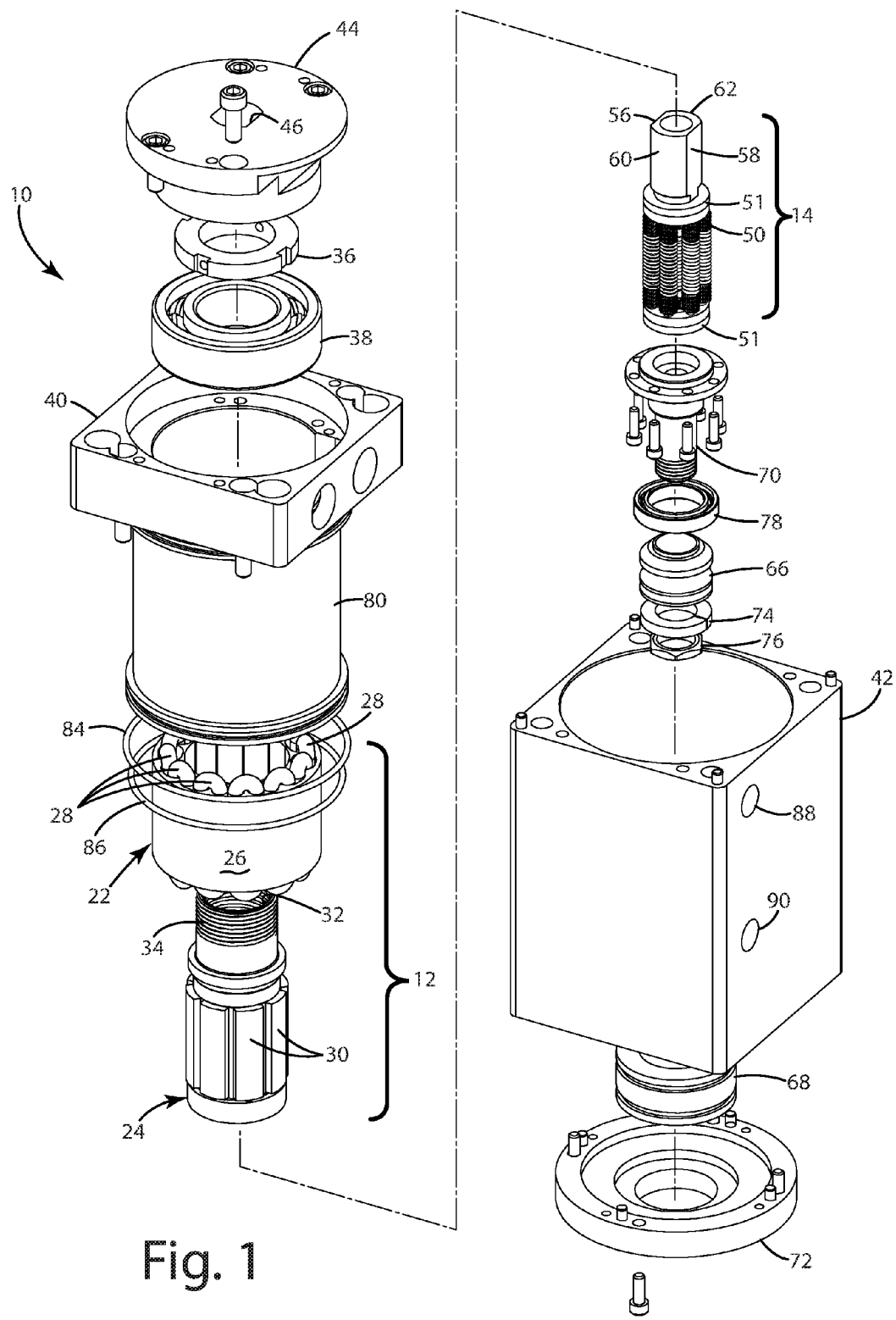
FIG. 1 is an exploded view of a valve gate assembly actuator in accordance with one embodiment.
Figure 2:
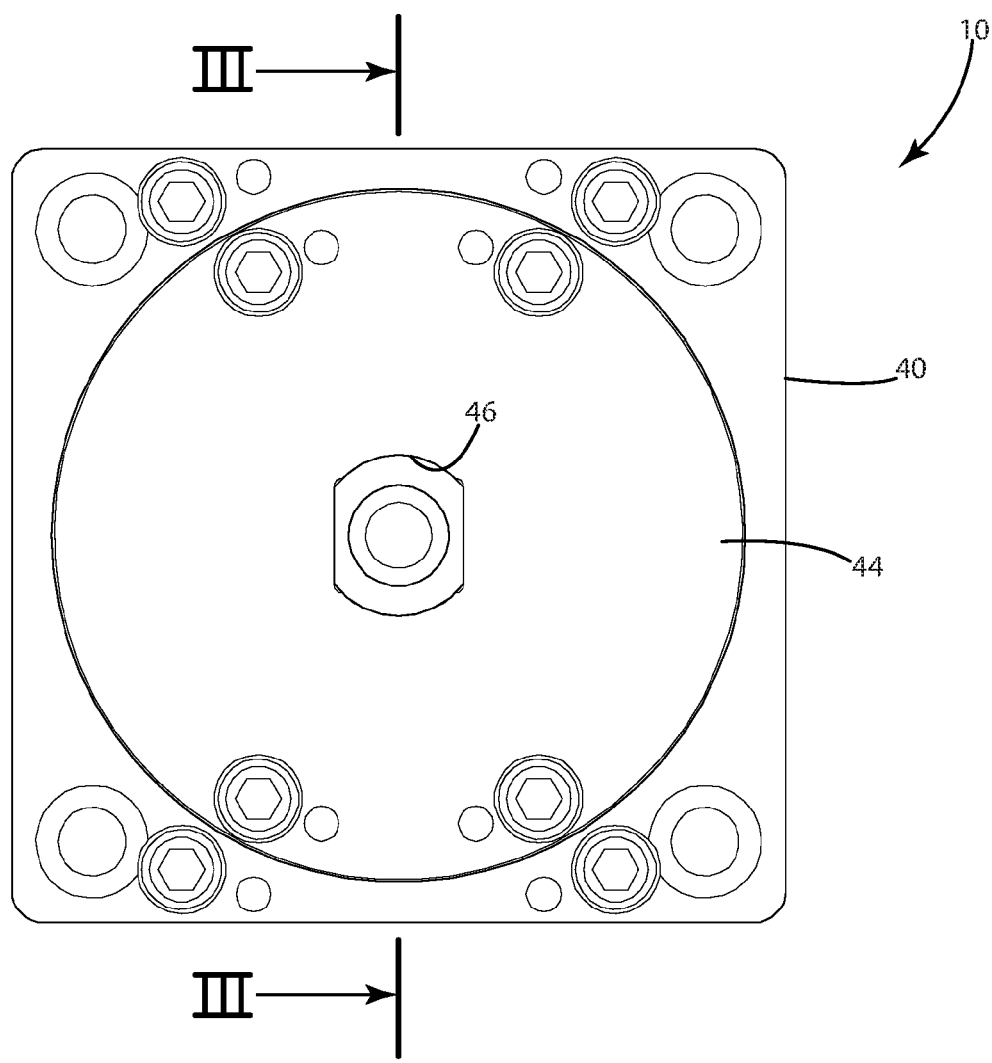
FIG. 2 is a top plan view of the valve gate assembly actuator of FIG. 1.
Figure 3:
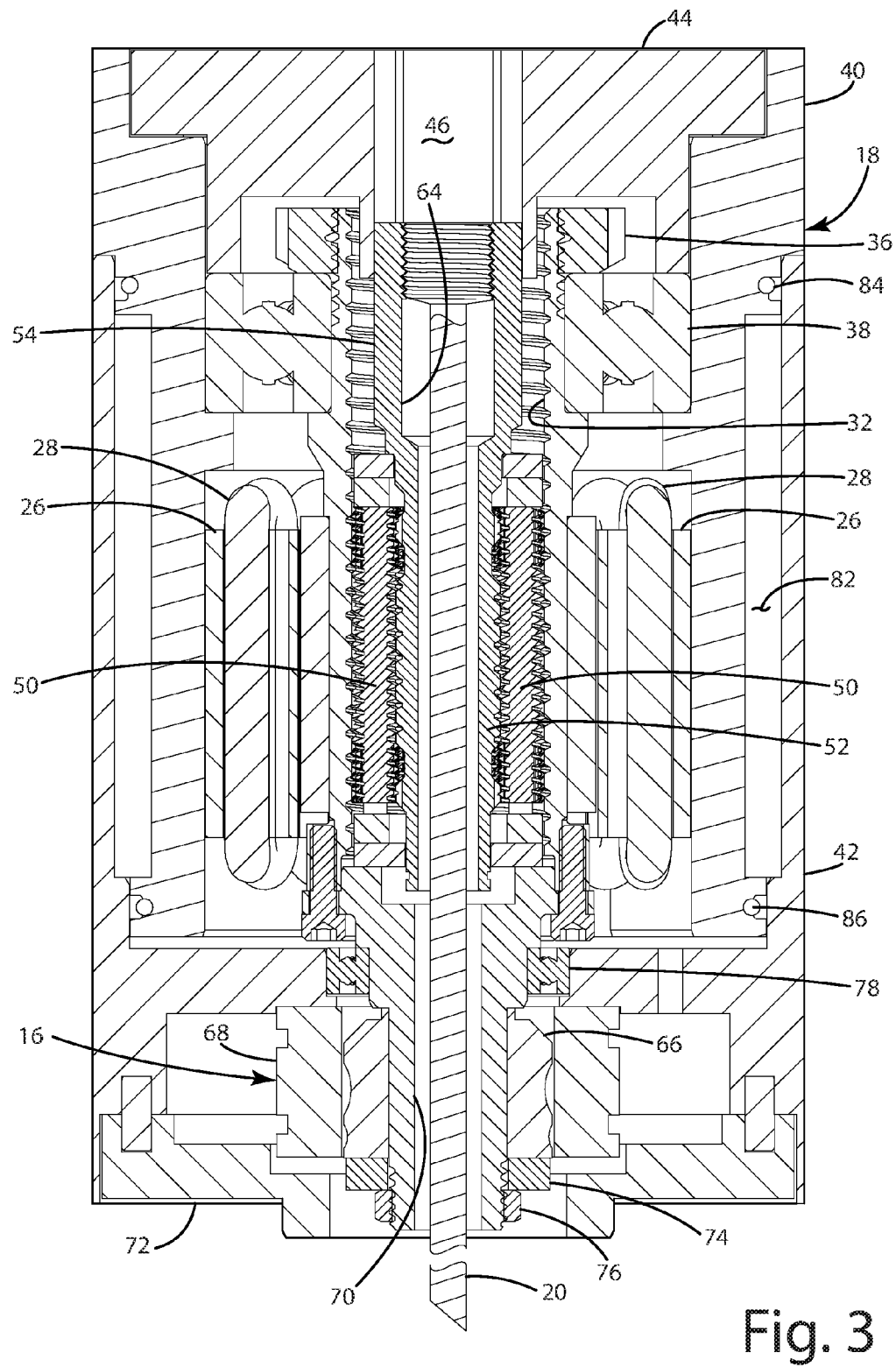
FIG. 3 is a cross-sectional view of the valve gate assembly actuator taken along line 3-3 of FIG. 2.

Referring to FIGS. 1-3, an actuator 10 for a valve gate assembly is illustrated and generally designated 10. As discussed below, the actuator 10 includes an electrical motor 12, a planetary assembly 14, and a rotary encoder 16 contained within a housing 18 having an internal cooling volume. A valve gate pin 20, when coupled to the actuator 10, forms part of a computer-controlled valve gate assembly for a plastic injection molding system. The valve gate assembly is therefore configured to regulate the flow of molten plastic into a mold for forming one or more finished plastic articles with precisely controlled volume shots of molten plastic.

The electrical motor 12 is generally adapted to cause rotation of the planetary assembly 14. In the current embodiment, the electrical motor 12 is a bi-directional three-phase induction motor. As shown in FIG. 1, the three-phase induction motor 12 includes a stator 22 and a rotor 24. The stator 22 includes a cylinder 26 and a plurality of conductive windings 28 that are electrically coupled to a three-phase power supply (not shown). The rotor 24 includes a cylindrical laminated core with parallel slots that carry conductors 30. Electrical power applied to the stator 22 induces a current in the conductors 30, which applies a torque to the rotor 24. The subsequent rotation of the rotor 24 is converted into a linear motion by the planetary assembly 14, which is intermeshed with a threaded interior opening 32 in the rotor 24. In a manner that is known in the art, the torque applied to the rotor 24 can also include a braking torque to arrest rotation of the rotor 24 and/or to reverse its direction of rotation.

As shown in FIG. 3, the interior opening 32 of the rotor 24 is threaded along its length. The rotor 24 also includes a threaded exterior portion 34 at its upper end for a locking nut 36. When assembled, the locking nut 36 is positioned opposite an annular contact bearing 38. The annular contact bearing 38 extends around the rotor 24 at its upper end to facilitate its rotation relative to an inner housing member 40. The inner housing member 40 interfaces with an outer housing member 42 to house the stator 22 and the rotor 24 therein. The housing 18 additionally includes a guide bushing 44 that is fastened to the inner housing member 40 to substantially enclose the upper end of the housing 18. The guide bushing 44 defines a guide channel 46 extending entirely through the guide bushing 44, the guide channel 46 being shaped to prevent rotation of an object therein. In particular, the guide channel 46 includes opposing planar sidewalls and opposing annular sidewalls that prevent a corresponding object from rotating, while permitting back-and-forth movement of the object within the guide channel 46.

The planetary assembly 14 includes planet gears 50 that are intermeshed with the threaded interior opening 32 of the rotor 24. Rotation of the rotor 24 imparts rotation of the planet gears 50 about their respective axes. The planet gears 50 are leadscrews in the illustrated embodiment, with six leadscrews illustrated as surrounding a sun screw 52. The planet gears 50 can include greater or fewer leadscrews in other embodiments. The planet gears 50 are parallel to each other and extend in the lengthwise direction of the planetary assembly 14. Upper and lower carriers 51 are joined to the center of each planet gear 50 and rotate about the sun screw 52. The sun screw 52 is intermeshed with each of the planet gears 50, the sun screw 52 comprising an outwardly threaded hollow shaft. The sun screw 52 additionally includes a mounting head 54 with an outer surface that is not-rotatable within the guide channel 46. In particular, the mounting head 54 includes opposing planar sidewalls 56, 58 interconnecting opposing annular sidewalls 60, 62. The mounting head 54 also includes a central channel 64 that is partially threaded for attachment to the valve gate pin 20, allowing the valve gate pin 20 to be adjustable. Because the sun screw 52 is prevented from rotating relative to the housing 18, rotation of the planet gears 50 causes an upward or downward translation of the sun screw 52 within the threaded interior opening 32 in the rotor 24. Accordingly, the actuator 10 effectively includes an epicyclic gear train, including a sun gear 52, planet gears 50, a carrier 51, and a ring gear, which is effectively the threaded interior opening 32 of the rotor 24.

Referring again to FIG. 1, the rotary encoder 16 includes an encoder ring 66 and an encoder sensor 68. The encoder ring 66 is coupled to a hollow spindle 70 that rotates in unison with the planetary assembly 14, and in particular the carrier 51. The encoder sensor 68 and the encoder ring 66 are concentrically arranged with respect to each other as shown in FIG. 3, with the encoder sensor 68 being positioned radially outward of the encoder ring 66. Rotation of the encoder ring 66 is converted to an analog or digital signal by the encoder sensor 68 for output to a controller. The controller tracks the direction and magnitude of rotation of the encoder ring 66, and by extension, the rotor 24. The housing 18 includes a bottom cap 72 that is fastened to the outer housing 42 to secure the encoder 16 therebetween. The bottom cap 72 includes a central opening to permit the valve gate pin 20 to extend therethrough. A lock washer 74 and a jam nut 76 secure the encoder ring 66 in position with respect to the hollow spindle 70, such that the encoder ring 66 rotates in unison with the hollow spindle 70. A bearing 78 extends around the hollow spindle 70 to permit the hollow spindle to rotate with respect to the outer housing 42.

To reiterate, the housing 18 includes an inner housing 40, an outer housing 42, a guide bushing 44, and a bottom cap 72. As also shown in FIG. 3, the outer housing 42 is spaced apart from a cylindrical sidewall 80, which is an extension of the inner housing 40 and which separates the motor 12 from an internal cooling volume 82. The internal cooling volume is bordered by upper and lower o-rings 84, 86 and circumferentiates the cylindrical sidewall 80. As perhaps best shown in FIG. 3, the height of the internal cooling volume 82 encompasses the windings 28 and at least a substantial portion of the annular contact bearing 38. The outer housing 42 includes an inlet opening 88 and an outlet opening 90 for a cooling fluid, and is otherwise sealed off from the remainder of the actuator 10. During use, water is pumped through the inlet opening 88, circulates around the cylindrical sidewall 80, and is discharged through the outlet opening 90. The continuous circulation of water through the cooling volume draws heat through the cylindrical sidewall 80 to prevent overheating of the windings 28 or the annular contact bearing 38.

II. Actuator Operation

In operation, the molding process can begin with the valve gate pin 20 in the fully extended (closed) position such that molten plastic is prevented from flowing into the mold cavity. When it is determined to allow molten plastic into the mold, a controller closes a relay to couple the actuator 10 to a three-phase AC power supply. Electrical power applied to the motor 12, and in particular the stator 22, induces a current in the rotor 24. The rotor 24 applies a torque to the planetary assembly 14, which includes planet gears 50 that are intermeshed with the threaded interior opening 32 of the rotor 24. Because the sun screw 52 is prevented from rotating, the planet gears 50 convert rotation of the rotor 24 into linear movement of the sun screw 52 within the threaded interior opening 32 of the rotor 24. Linear movement of the sun screw 52 causes a corresponding movement of the valve gate pin 20, which is secured to the mounting head 54 of the sun screw 52. The analog or digital output of the encoder sensor 68 provides the controller with position data relating to the angular position of the encoder ring 66, and by extension the carrier 51, for determining the precise position of the valve gate pin 20, optionally in increments of as little as 0.001 inches, and for precisely controlling the speed of the valve gate pin 20, which is variable. When the valve gate pin 20 reaches the desired position, having been retracted from the valve gate by a desired amount and at a desired speed, the controller stops rotation of the motor 12. In this position, molten plastic flows through the valve gate and into the mold cavity. The actuator 10 can position the valve gate pin 20 between the fully open and fully closed position as needed, and can extend the valve gate pin 20 at the desired speed to close the valve gate, even against injection pressures of 25,000 psi. Throughout this process, which can be repeated for each controlled-volume shot of molten plastic, the controller can cause a cooling fluid to circulate through the cooling volume 82 in the housing 18. The cooling fluid, for example water, prevents the overheating of the windings 28 or the annular contact bearing 38 within the housing.

The current embodiment therefore provides an improved valve gate assembly actuator that eliminates the use of hydraulics and pneumatics. The actuator enables precision control of a valve gate pin in increments of as little as 0.001 inches while withstanding injection pressures of at least 25,000 psi. The actuator is capable of stopping the valve gate pin any point between fully closed and fully open and is capable of moving the valve gate pin at variable speeds. The actuator also includes continuous cooling to guard against overheating while also increasing its useful life for plastic injection molding operations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. An actuator for a valve gate assembly comprising:
a housing including a guide channel at one end portion thereof;
a motor contained within the housing, the motor including a rotor having a threaded interior opening;
a planetary assembly telescopically received within the motor and including:
a plurality of planet gears intermeshed with the threaded interior opening of the rotor, such that rotation of the rotor imparts rotation of the plurality of planet gears, and
a sun screw intermeshed with the plurality of planet gears, the sun screw including a mounting head that is non-rotatably received within the guide channel; and
an encoder contained within the housing for tracking relative rotation of the planetary assembly, wherein rotation of the planetary assembly is converted by the plurality of planet gears into linear motion of the sun screw for the controlled flow of molten plastic past a valve gate.

2. The actuator of claim 1 wherein the plurality of planet gears are leadscrews that are concentrically disposed about the sun screw.

3. The actuator of claim 1 wherein the outer surface of the mounting head includes first and second planar sidewalls interconnecting first and second annular sidewalls.

4. The actuator of claim 1 wherein the encoder includes an encoder ring and an encoder sensor, the encoder ring being rotatable in unison with the planetary assembly and the encoder sensor being fixed within the housing for measuring angular movement of the encoder ring.

5. The actuator of claim 4 further including a spindle fastened to the planetary assembly, the encoder ring extending around and being joined to the spindle.

6. The actuator of claim 1 wherein the housing includes an outer housing, an inner housing, a bottom cap, and a guide bushing, the guide channel being defined in the guide bushing.

7. The actuator of claim 1 wherein the motor is a three-phase induction motor operable to selectively generate a torque on the planetary assembly in each of two directions.

8. The actuator of claim 1 wherein the motor includes a stator and wherein the housing includes a cooling volume surrounding the stator.

9. The actuator of claim 8 wherein the cooling volume encompasses at least a portion of a bearing that supports rotation of the rotor.

10. The actuator of claim 9 wherein the housing defines an inlet opening and an outlet opening for the circulation of a cooling fluid through the cooling volume.

11. A valve gate assembly for an injection molding system, the valve gate assembly comprising:
a valve gate pin; and
an actuator for controlling movement of the valve gate pin, the actuator including:
a housing structure defining a guide channel,
a motor including a rotor defining a threaded interior opening,
a planetary assembly received within the threaded interior opening of the rotor, the planetary assembly including a plurality of planet gears intermeshed with the threaded interior opening and a sun screw intermeshed with the plurality of planet gears, the sun screw including a mounting head coupled to the valve gate pin, the mounting head being non-rotatably received within the guide channel to prevent relative rotation, and
an encoder for tracking relative rotation within the housing, wherein rotation of the rotor is converted by the planetary assembly into linear motion of the sun screw for the controlled displacement of the valve gate pin relative to a valve gate at a desired speed, wherein the valve gate pin is displaceable by the actuator at a plurality of speeds.

12. The valve gate assembly of claim 11 wherein the valve gate pin extends through a longitudinal bore defined within the planetary assembly.

13. The valve gate assembly of claim 12 wherein the valve gate pin does not rotate within the longitudinal bore and includes a beveled tip.

14. The valve gate assembly of claim 11 wherein the encoder includes an encoder ring and an encoder sensor, the encoder ring being rotatable in unison with the rotor and the encoder sensor being fixed with respect to the housing for measuring angular movement of the encoder ring.

15. The valve gate assembly of claim 11 wherein the motor includes a stator and wherein the housing includes an annular channel surrounding the stator to define a cooling volume.

16. The valve gate assembly of claim 15 wherein the housing defines an inlet opening and an outlet opening for the circulation of a cooling fluid through the cooling volume.

17. The valve gate assembly of claim 11 wherein the plurality of planet gears are leadscrews that are concentrically disposed about the sun screw.

18. The valve gate assembly of claim 11 wherein the outer surface of the mounting head includes first and second planar sidewalls interconnecting first and second annular sidewalls.

19. The valve gate assembly of claim 11 wherein the housing structure is a guide bushing, the guide channel being defined in the guide bushing.

20. The valve gate assembly of claim 11 wherein the motor is a three-phase induction motor operable to selectively generate a torque on the planetary assembly in each of two directions.

\* \* \* \* \*